US012610096B1

(12) United States Patent
Hernandez et al.

(10) Patent No.: US 12,610,096 B1
(45) Date of Patent: Apr. 21, 2026

(54) METHODS AND SYSTEMS FOR DETECTING AND CORRECTING VIDEO ENCODER AND STREAMING FAULTS

(71) Applicant: CBS Interactive Inc., San Francisco, CA (US)

(72) Inventors: Alexander Hernandez, Coral Springs, FL (US); Jacob Harrison Robins, Chicago, IL (US)

(73) Assignee: CBS Interactive Inc., San Francisco, CA (US)

( * ) Notice: Subject to any disclaimer, the term of this patent is extended or adjusted under 35 U.S.C. 154(b) by 0 days.

(21) Appl. No.: 19/010,531

(22) Filed: Jan. 6, 2025

(51) Int. Cl.
  *H04N 21/24* (2011.01)
  *H04N 21/25* (2011.01)

(52) U.S. Cl.
  CPC ......... *H04N 21/2407* (2013.01); *H04N 21/25* (2013.01)

(58) Field of Classification Search
  None
  See application file for complete search history.

(56) References Cited

U.S. PATENT DOCUMENTS

| | | | | | |
|---|---|---|---|---|---|
| 5,835,493 | A | * | 11/1998 | Magee | H04N 21/238 |
| | | | | | 375/E7.02 |
| 6,018,366 | A | * | 1/2000 | Asai | H04N 19/61 |
| | | | | | 375/240.18 |
| 6,421,359 | B1 | * | 7/2002 | Bennett | H04N 21/23655 |
| | | | | | 375/E7.269 |
| 9,258,589 | B2 | | 2/2016 | Grouf et al. | |
| 11,178,433 | B2 | | 11/2021 | Hou | |
| 11,533,527 | B2 | | 12/2022 | Shanson et al. | |
| 2007/0058730 | A1 | * | 3/2007 | Bowra | H04N 19/61 |
| 2008/0170621 | A1 | * | 7/2008 | Dvir | H04N 7/181 |
| | | | | | 375/240.18 |

(Continued)

FOREIGN PATENT DOCUMENTS

| | | | | | |
|---|---|---|---|---|---|
| BR | 112015001111 | B1 | * | 3/2021 | H04N 19/14 |
| CN | 101500170 | A | * | 8/2009 | H04N 21/4344 |

(Continued)

*Primary Examiner* — William J Kim
(74) *Attorney, Agent, or Firm* — Knobbe, Martens, Olson & Bear LLP

(57) ABSTRACT

Methods and systems are disclosed configured to detect and correct content streaming-related faults. Streaming video content comprising a color component is monitored. A central tendency of the color component is determined using color component intensity values from a plurality of frames of the streaming video content. A determination is made as to whether the central tendency value satisfies a corresponding threshold value. If the central tendency value fails to satisfy the corresponding threshold value, a corrective action is initiated comprising restarting a video encoder used to encode the streaming video content, switching to an alternate video encoder, and/or transmitting an electronic message to one or more destinations. Optionally, interruptions of closed captions for streaming video content may be detected using a determination of word quantities over a time. Such interruptions of closed captions may be corrected by accessing an alternate server and/or by transmitting an electronic message.

21 Claims, 14 Drawing Sheets

(56)  References Cited

U.S. PATENT DOCUMENTS

| | | | | |
|---|---|---|---|---|
| 2008/0282299 A1* | 11/2008 | Koat | ................. | H04N 21/2747 |
| | | | | 725/93 |
| 2009/0190670 A1* | 7/2009 | Lin | ................... | H04N 21/4425 |
| | | | | 375/E7.2 |
| 2010/0226444 A1* | 9/2010 | Thevathasan | ...... | H04N 21/2381 |
| | | | | 375/E7.026 |
| 2012/0260277 A1* | 10/2012 | Kosciewicz | ......... | H04N 17/004 |
| | | | | 725/31 |
| 2014/0095668 A1 | 4/2014 | Oyman | | |
| 2015/0003517 A1* | 1/2015 | Misumi | .............. | H04N 21/2383 |
| | | | | 375/240.02 |
| 2015/0163275 A1 | 6/2015 | Green | | |
| 2016/0261884 A1* | 9/2016 | Li | ........................ | H04N 19/587 |
| 2016/0261885 A1* | 9/2016 | Li | ........................ | H04N 19/132 |
| 2017/0041238 A1 | 2/2017 | Do et al. | | |
| 2017/0374581 A1 | 12/2017 | Dao | | |
| 2019/0082238 A1* | 3/2019 | Sengupta | ......... | H04N 21/23106 |

FOREIGN PATENT DOCUMENTS

| | | | | | | |
|---|---|---|---|---|---|---|
| CN | 102365868 | A | * | 2/2012 | ........... | H04N 19/136 |
| CN | 108156481 | A | * | 6/2018 | ........ | H04N 21/4425 |
| CN | 104410918 | B | * | 1/2019 | ....... | H04N 21/47205 |
| EP | 4050897 | A1 | * | 8/2022 | ....... | H04N 21/64322 |
| KR | 100684290 | B1 | * | 2/2007 | ....... | H04N 21/23617 |
| KR | 20170100847 | A | * | 9/2017 | ........ | H04N 21/4425 |
| WO | WO-2012130069 | A1 | * | 10/2012 | ........... | H04N 21/238 |
| WO | WO-2012136260 | A1 | * | 10/2012 | ........... | H04N 21/442 |
| WO | WO-2013124223 | A1 | * | 8/2013 | ......... | H04N 21/4424 |

* cited by examiner

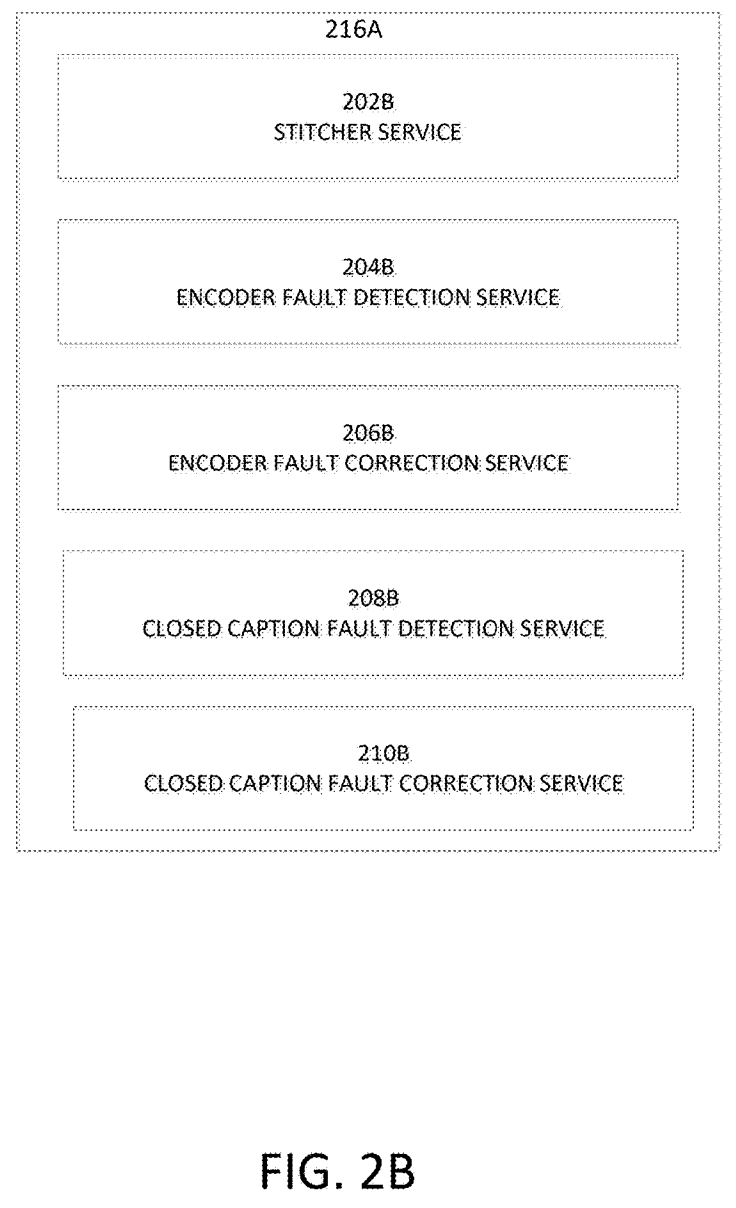

216A

202B
STITCHER SERVICE

204B
ENCODER FAULT DETECTION SERVICE

206B
ENCODER FAULT CORRECTION SERVICE

208B
CLOSED CAPTION FAULT DETECTION SERVICE

210B
CLOSED CAPTION FAULT CORRECTION SERVICE

FIG. 2B

302A
SELECT CONTENT CRITERIA

304A
SELECT AT LEAST A THRESHOLD
NUMBER OF CONTENT ITEMS
THAT SATISFY CONTENT
CRITERIA

306A
DETERMINE CENTRAL
TENDENCIES OF COLOR SPACE
VALUES

308A
SET COLORSPACE THRESHOLDS

602B

604B

METHODS AND SYSTEMS FOR DETECTING AND CORRECTING VIDEO ENCODER AND STREAMING FAULTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field

The present disclosure is related to video content streaming.

Description of the Related Art

Streaming media has become an important mechanism for delivering video content to users. However, often streaming encoders can degrade due to signal loss and/or network interruptions which results in degraded streaming content. For example, the faulty operation of the encoder may result in a drastic shift in color space of the streaming video content.

Other types of streaming operations may be interrupted, causing faulty playback of content. For example, closed captioning feeds may be interrupted (e.g., as a result of a server failure).

Conventionally, such streaming-related failures may not be detected at all or may not be detected until many hours or days after the failures occurred. Hence, the correction of such technical problems may not occur at all or may not occur until many users experienced faulty streaming experiences for an extended period of time.

BRIEF DESCRIPTION OF THE DRAWINGS

FIG. 2B illustrates example modules and services of the content streaming system.

Figure 1:
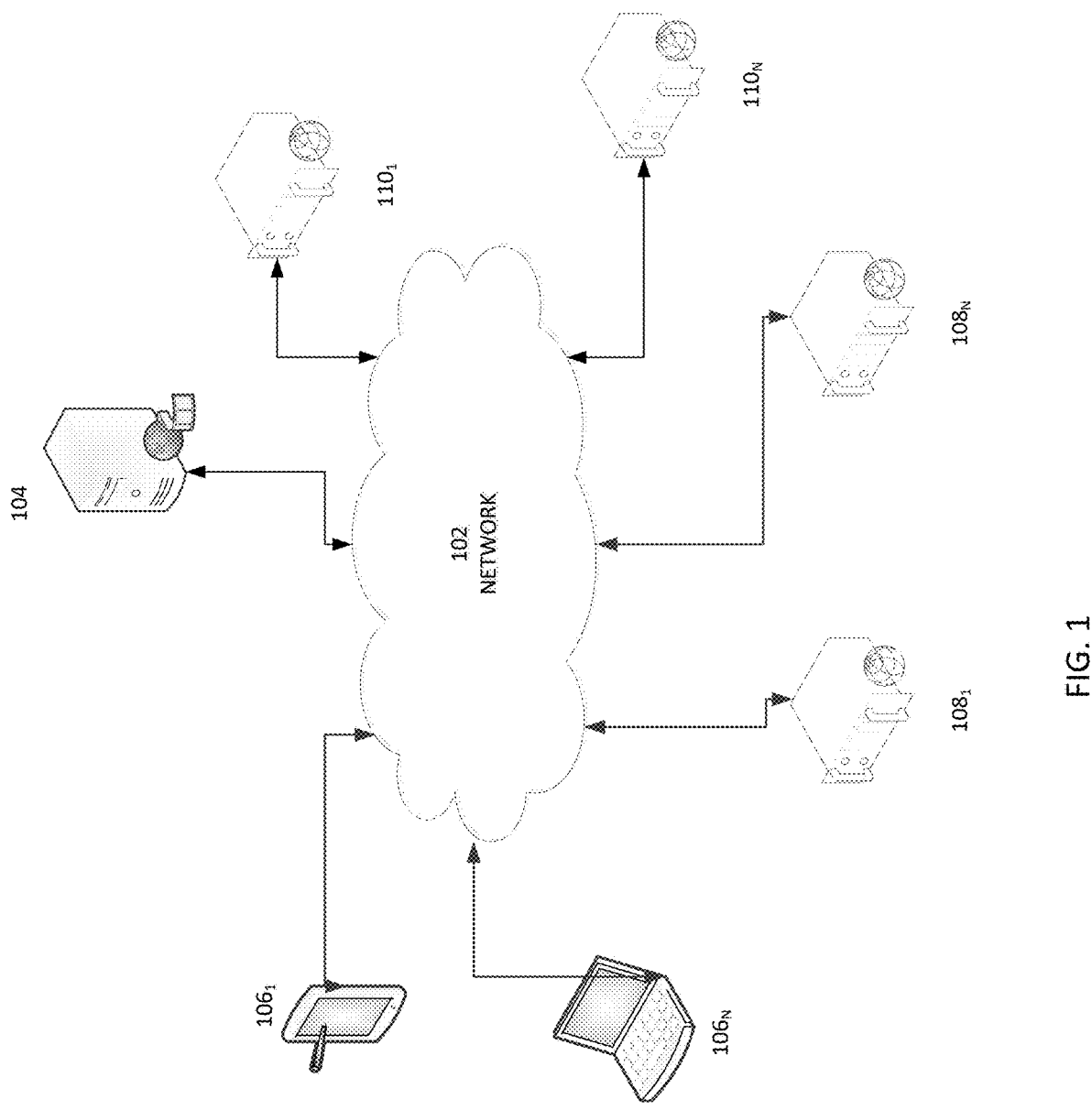
FIG. 1 illustrates an example networked environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

The present disclosure describes systems and processes that overcome the above described technical problems as well as the drawbacks of conventional approaches to detecting and correcting streaming content failures. It is understood that the various aspects disclosed herein may be utilized together (e.g., via common system(s)) or separately.

As similarly discussed elsewhere herein, streaming media has become an important mechanism for delivering video content to users. However, often streaming video encoders can degrade due to signal loss and/or network interruptions which results in degraded streaming content. For example, the faulty operation of the encoder may result in a drastic shift in color space of the streaming video content.

By way of background, a video encoder may comprise a device and/or software that compress raw video data into a specific format for efficient storage or transmission while maintaining visual quality. The encoder may achieve this by analyzing the video frames and reducing redundancies using compression algorithms such as H.264, H.265, or VP9. For example, temporal and spatial compression may be performed by the encoder, where differences between consecutive frames and within individual frames are minimized. The encoder may perform bitstream packaging, which prepares the compressed data for delivery to user devices.

A color component failure in a video encoder can occur due to errors in the handling of color data during processing. Hardware malfunctions in the encoder, such as defective circuitry in the processing unit, or software bugs in the encoding algorithms, can also disrupt the representation of specific color channels. Such failures may manifest as color shifts, artifacts, or the absence of specific colors in the output, severely affecting the video's visual fidelity.

Other types of streaming operations may be interrupted, causing faulty or interrupted playback of content. For example, closed caption feeds may be interrupted (e.g., as a result of a server or network failure) providing a degraded viewing experience (where the video content is displayed without closed captions) for those that rely on closed captioning and potentially violating governmental regulations.

By way of example, closed caption streaming faults may be caused by one or more of the following technical problems: a messaging service crash, a server crash, a network interface failure, and/or the like.

Conventionally, such streaming-related failures may not be detected at all or may not be detected until many hours or days after the failures occurred. Hence, the correction of such technical problems may not occur at all or may not occur until many users experienced faulty streaming experiences for extended periods of time.

Described herein are technical solutions to detecting and correcting the foregoing streaming faults. Such detection may be performed in real time or in near real time (e.g., with 1-20 minutes of the fault occurring). The correction of such streaming faults may optionally also be initiated in real time. One or more of the disclosed systems and methods may be configured to perform some or all of the fault detection and/or fault correction techniques described herein.

For example, with respect to a video streaming encoder fault, as will be described elsewhere herein, a streaming video encoder failure may be detected by monitoring the colorspace (e.g., the red (R), green (G), and/or blue (B) values,) of streaming content. An RGB colorspace is a method for representing colors by combining the three primary colors of light: Red (R), Green (G), and Blue (B). Other colorspaces may be used (e.g., CMYK, LAB, YUV, and/or the like). In response to detecting a deviation by the colorspace (e.g., one or more of the R, G, B values) from a corresponding threshold (e.g., a deviation exceeding the threshold at all, or by more than a certain amount or percentage), a determination may be made that a streaming video encoder fault has occurred. In response to determining that a streaming video encoder fault has occurred, one or more corrective actions may be taken. Such corrective actions may include, by way of example, switching to an alternate streaming video encoder, restarting the faulty video encoder, transmitting an electronic message (e.g., comprising fault data and one or more instructions) to one or more destinations that can perform corrective action, and/or the like.

By way of further example, with respect to detecting the interruption of closed captioning (e.g., caused by a closed caption server fault, high traffic or resource limitations on the caption service server, poor network conditions causing dropped or delayed captioning packets, and/or the like), closed captioning data may be monitored. For example, a determination may be made as to whether the number of closed caption words over a specified period of time falls below a specified threshold. In response to detecting that the number of closed caption words over the specified period of time falls below the specified threshold, a determination may be made that the closed caption streaming service has been interrupted.

At least partly in response to determining that the closed caption streaming has been interrupted, one or more corrective actions may be taken. Such corrective actions may include, by way of example, switching to an alternate streaming closed captioning source, restarting the closed captioning server, transmitting an electronic message (e.g., comprising fault data and one or more instructions) to one or more destinations that can perform corrective actions, and/or the like.

Certain example aspects will now be discussed with reference to the figures. FIG. 1 illustrates an example environment. A content streaming system 104 (which may include a stitcher component, such as a stitcher server, providing stitcher services) is connected to a network 102 (e.g., the Internet, other wide area network, an intranet, or other network). The content streaming system 104 is configured to communicate with client devices $106_1$ . . . $106_n$ (e.g., smart phones, connected televisions, tablet computers, laptop computers, desktop computers, game consoles, and/ or the like) that comprise or provide access to video players. By way of example, the video player may be embedded in a webpage, may be a dedicated video player application, or may be part of a larger app (e.g., a game application, a word processing application, etc.).

For example, the content streaming system 104 may receive a request for media from a given client device 106 in the form of a request for a playlist manifest or updates to a playlist manifest. The content streaming system 104 may identify, from a file, the location and length of an interstitial pod (a time frame reserved for interstitials, wherein one or more interstitials may be needed to fill a pod), determine context information (e.g., information regarding the primary content being requested, information regarding the user, and/or other context information), solicit and select interstitial content from third parties (which may not have closed captioning available), define customized interstitials as described herein, generate playlist manifests, and/or perform other functions described herein. The content streaming system 104 and/or another system may stream requested content to the requesting device 106.

Optionally, the content streaming system 104 may transmit context information to one or more interstitial source systems $108_1$ . . . $108_n$. For example, the source systems $108_1$ . . . $108_n$ may optionally include ad servers, and the interstitial content may comprise ads. The interstitial source systems $108_1$ . . . $108_n$ may comply with the VAST protocol.

By way of further example, the interstitial source systems $108_1$ . . . $108_n$ may provide public service videos, previews of upcoming programs, quizzes, news, games, and/or other content. The interstitial source systems $108_1$ . . . $108_n$ may use the context information in determining what interstitial content is to be provided or offered to the requesting client device 106. Optionally, the interstitial source systems $108_1$ . . . $108_n$ may submit bids to place interstitial content in association with primary content, and the content streaming system 104 may evaluate the bids and optionally based at least in part on the bids, select one or more items to insert into an interstitial pod.

Closed captioning systems $110_1$ . . . $110_n$ are configured to provide closed caption text for content streamed by the content streaming system 104. Optionally, the closed captioning systems $110_1$ . . . $110_n$ may be included in the content streaming system 104. A given closed captioning system 110 may utilize Automatic Speech Recognition (ASR).

The ASR may comprise one or more artificial intelligence models trained to perform speech to text on audio tracks of streaming content. The models may be trained on large datasets of audio and text pairs to recognize speech patterns, accents, and contextual nuances. Natural language processing may be utilized to refine the raw text by placing or correcting grammar and punctuation, identifying speaker changes and assigning labels, ensuring contextually accurate word choices, such as for homophones (e.g., "their" vs. "there"), and/or performing sentiment analysis and intent detection to add contextual layers to captions. The transcribed (and optionally corrected) text may be synchronized with the audio using a time-stamping process. This ensures captions appear on-screen precisely when the words are spoken in the content soundtrack. Optionally, the text may be divided into manageable chunks (e.g., lines) based on speech pauses, ensuring captions are readable. Optionally, language models may be utilized to predict the next likely word based on previous words to enhance transcription accuracy (e.g., particularly when the soundtrack includes significant background noise or includes complex vocabulary). The closed captioning may be formatted using a cross-platform format (e.g., WebVTT, SRT, SubRip, or other formats) to ensure the captions work across platforms.

The content streaming system 104 may include a fault detection system configured to detect and optionally attempt to correct streaming-related faults as described elsewhere herein (e.g., degraded streaming encoder operation, interruption of a closed caption stream, and/or the like).

Figure 2A:
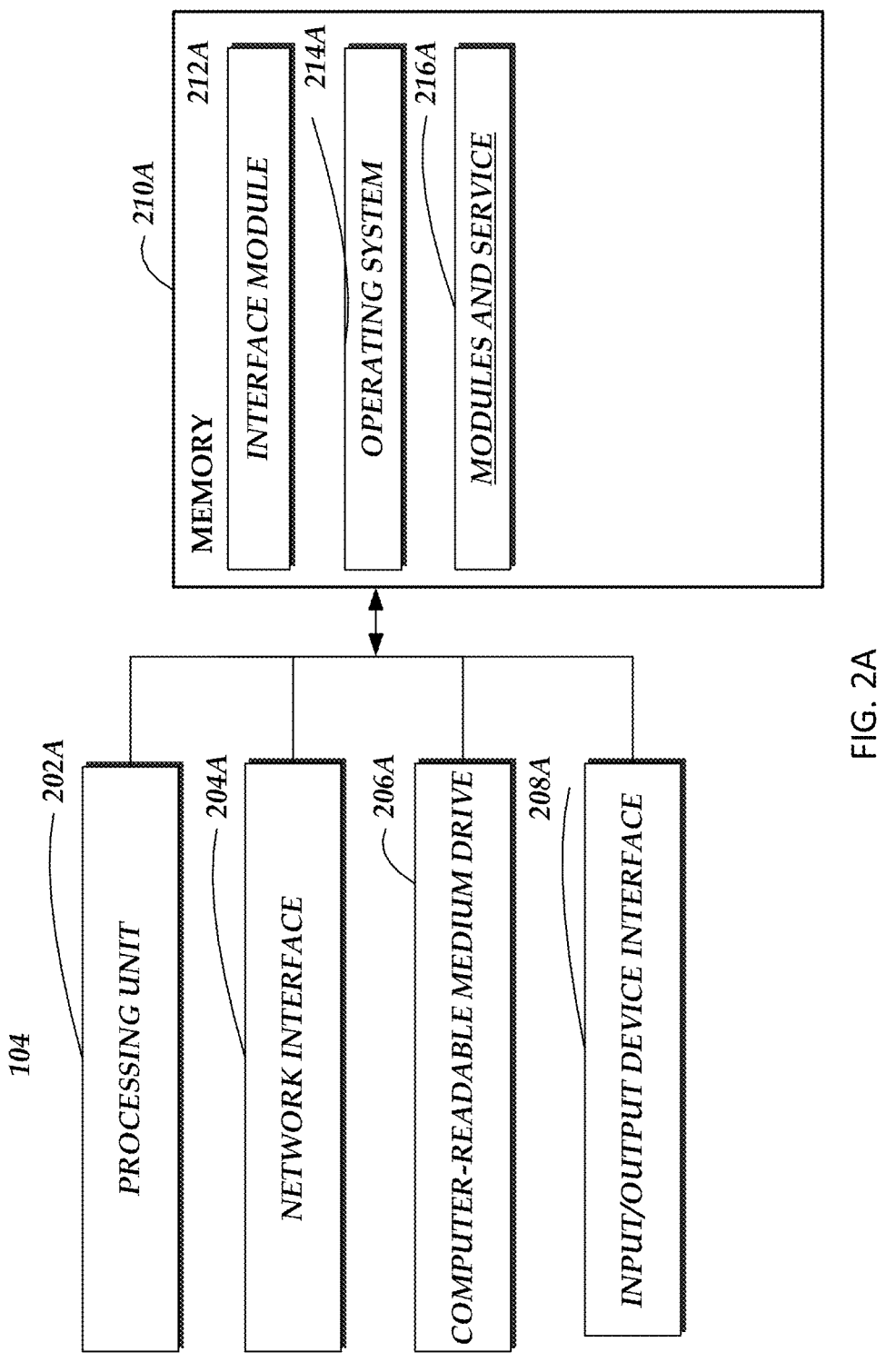
FIG. 2A is a block diagram illustrating example components of an example content streaming system.

FIG. 2A is a block diagram illustrating example components of a content streaming system 104 which may host a fault detection system configured to detect and optionally attempt to correct streaming video encoder faults and/or closed captioning outages as described elsewhere herein. The example content streaming system 104 includes an arrangement of computer hardware and software components that may be used to implement aspects of the present disclosure. Those skilled in the art will appreciate that the example components may include more (or fewer) components than those depicted in FIG. 2A. The content streaming system 104 may optionally be a cloud-based system including a hosted computing environment that includes a collection of physical computing resources that may be remotely accessible and may be rapidly provisioned as needed. Further, the content streaming system 104 may include or utilize a hosted storage environment that includes a collection of physical data storage devices that may be remotely accessible and may be rapidly provisioned as needed (sometimes referred to as "cloud" storage). Such cloud storage may be utilized to store some, or all of the data, programs, and content described herein.

The content streaming system 104 may include one or more processing units 202A comprising one or more processing devices (e.g., a general purpose processor, an encryption processor, a video transcoder, and/or a high speed graphics processor), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks (e.g., the Internet, local area networks, wide area networks, personal area networks, etc.) and/or computing systems (e.g., secondary content source systems, client devices, etc.). The processing unit 202A may thus receive information, content, and instructions from other computing devices, systems, or services via a network, and may provide information, content (e.g., streaming video content, manifests, ad-pod files, content item previews, downloadable content, electronic program guides, etc.), and instructions to other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute to implement one or more aspects of the present disclosure. The memory 210A generally includes RAM, ROM and/or other persistent or non-transitory computer-readable storage media. The memory 210A may include cloud storage. The memory 210A may store an operating system 214A that provides computer program instructions for use by the processing unit 202A in the general administration and operation of the modules and services 216A, including its components. The modules (e.g., comprising software code) and services 216A are further discussed with respect to FIG. 2B and elsewhere herein. The memory 210A may further include other information for implementing aspects of the present disclosure.

The memory 210A may include an interface module 212A. The interface module 212A can be configured to facilitate generating one or more interfaces through which a compatible computing device may send to, or receive from, the modules and services 216A.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include a general purpose processor and may optionally include a video encoder (e.g., a video codec comprising a video encoder and decoder).

The system 104 may offload certain compute-intensive portions of the modules and services 216A (e.g., transcoding and/or transrating a stream for adaptive bitrate operations, compositing, and/or the like) to one or more dedicated devices, such as a video codec (e.g., H.264 encoders and decoders), while other code may run on a general purpose processor. The system 104 may optionally be configured to support multiple streaming protocols (e.g., HLS, MPEG DASH, etc.), may provide low latency pass-through, and may support a large number of parallel streams (e.g., HD, 4K, and/or 8K streams).

The processing unit 202A may include hundreds or thousands of core processors configured to process tasks in parallel. A Graphics Processing Unit (GPU) may be configured for parallel processing, making it highly effective for rendering graphics and performing computationally intensive tasks, such as certain tasks described herein. The GPU architecture may include a large number of smaller, efficient cores organized into groups, enabling simultaneous execution of thousands of threads. The cores are optionally structured into streaming multiprocessors (SMs), where a given SM may contain an array of Arithmetic Logic Units (ALUs), control units, and memory caches. A GPU may have a memory hierarchy that includes high-speed local memory for SMs and a larger global memory accessible to some or all cores, with high bandwidth to manage large datasets such as textures and matrices. To optimize performance, the architecture may incorporate features such as warp scheduling, where threads are grouped into "warps" for synchronized execution, and mechanisms for latency hiding, allowing overlapping of computation with memory access. This architecture may be utilized for tasks that need massive parallelism, such as 3D rendering, machine learning, and scientific simulations.

The chip layout of a Graphics Processing Unit may be optimized for parallel processing and high throughput, with its surface area densely packed with various functional units, such as those described herein. The SMs are optionally distributed across the chip and connected via a high-bandwidth interconnect. Optionally, surrounding the SMs are specialized units, such as texture processing units (TPUs) for handling texture mapping, and rasterization units for rendering tasks. The chip may comprise memory controllers that manage access to the GPU's global memory, including high-bandwidth memory (HBM) and/or GDDR (graphics double data rate) memory. The memory controllers may be positioned strategically to reduce latency and improve data flow. Optionally, the chip includes a command processor for interfacing with the CPU, cache hierarchies for low-latency data access, and tensor or ray-tracing cores in modern GPUs to accelerate artificial intelligence and real-time rendering tasks.

Power and thermal management components are integrated into the design, ensuring efficient energy use and maintaining performance under heavy loads. Optionally, Dynamic Voltage and Frequency Scaling (DVFS) may be utilized to adjust clock speeds and voltage in real-time, scaling power usage to match computational demands. Optionally, the chip may include integrated thermal sensors configured to monitor chip temperatures across various areas, enabling precise adjustments to cooling systems and performance parameters to maintain a desired temperature. Optionally cooling techniques, such as variable-speed fans, heat pipes, and/or vapor chambers, may be utilized to efficiently dissipate heat generated during intense computational operations. The chip may optionally include Power Management Integrated Circuits (PMICs) configured to ensure stable voltage delivery to GPU cores, memory, and other components, optimizing energy distribution and preventing surges. Optionally, the chip may comprise power capping mechanisms configured to limit energy consumption under high loads to avoid overheating, while using thermal throttling to reduce clock speeds when temperatures approach specified thresholds, thereby reducing the chances of a hardware failure.

As another example, the system 104 and its components can be implemented by network servers, application servers, database servers, combinations of the same, and/or the like, configured to facilitate data transmission to and from data stores, user terminals, and third party systems via one or more networks. Accordingly, the depictions of the modules, comprising software code, are illustrative in nature.

Referring to FIG. 2B the modules and services 216A may include software and/or hardware modules that provide a stitcher service 202B, An encoder fault detection service 204B, an encoder fault correction service 206B, a closed caption fault detection service 208B, and a closed caption fault correction service 210B.

As similarly discussed above, the stitcher service 202B may receive and process requests for playlist manifests from user device clients (e.g., video players). The stitcher service 202B may be configured to respond to playlist manifest requests by providing a playlist manifest (e.g., an HLS or MPEG DASH manifest) comprising manifest locators (e.g., URLs) pointing to segments of primary content and ad-pod placeholder URLs.

For example, a user device client (e.g., a video player hosted on a client device) may transmit a request for content in the form of a request for a playlist manifest (e.g., a static HLS .m3u8 or an MPEG DASH .mpd manifest file). The request may be for an item of primary content, such as a movie or episode. The request or other communication may identify user device characteristics such as device manufacturer, device model, display size (e.g., display height and width in pixels), device height/width ratio, device operating system, and/or other information.

The request for an item of content (and hence the playlist manifest) may have been triggered by the user manually clicking on a play control or other control, or the request may have been automatically issued by an application or webpage executing on the user device. For example, if the user has completed playing a first movie (or other content, such as a program episode), an application on the user device may automatically request a playlist manifest for the next scheduled movie (or other item of content).

The next scheduled item of contents may be scheduled in accordance with a program guide, where the program guide may include multiple channels (e.g., corresponding to different subject matters), where a given channel has associated programs (e.g., movies or other items of content) with scheduled start and end times. Thus, for example, a playlist manifest for a program may be automatically requested based at least in part on a comparison of the current time and the scheduled starting time for the item of content. If the difference between the current time and the scheduled starting time satisfies a threshold (which could be 0 seconds, or some larger number (e.g., 0.5, 1, or 2 seconds) to enable buffering of the program prior to the start time), the corresponding playlist manifest may be automatically requested and provided to the stitcher system.

The request from the video player on the user device for a playlist manifest may be received over a network (e.g., a wired or wireless network) by the stitcher service 202B. The location and length of secondary content pods within the requested primary content may be identified. For example, a file or other metadata associated with the primary content may be accessed that indicates the positions within the primary content for secondary content pods, wherein a given secondary content pod may have a specified length (e.g., 15 seconds, 30 seconds, 1 minute, 2 minutes, or other length). The stitcher service 202B may construct the requested playlist manifest, with locators (e.g., URLs) for the primary content and/or the secondary content (sometimes referred to herein as ancillary content).

For example, the manifest file may be an HLS .m3u8 or an MPEG DASH .mpd static manifest file. The manifest file may include locators (URLs) for each primary content and segment and may include URLs for secondary content pods (e.g., ad-pods), in the desired playback order. The manifest file may optionally include the entire playlist for the requested item of primary content.

The playlist manifest may be transmitted by the stitcher service 202B to the video player on the user device which receives the playlist manifest.

The encoder fault detection service 204B may comprise a video player or a program module that emulates a video player so that the fault detection service 204B sees what an end user video player would see. The encoder fault detection service 204B may be configured to detect encoder faults. For example, the encoder fault detection service 204B may optionally detect a streaming video encoder failure by monitoring the colorspace (e.g., the red (R), green (G), and/or blue (B) values or other appropriate colorspace) of streaming content. Other colorspaces may be used (e.g., CMYK, LAB, YUV, and/or the like). In response to detecting a deviation by the colorspace (e.g., one or more of the R, G, B values) from a corresponding threshold (e.g., a deviation exceeding the threshold at all, or by more than a certain amount or percentage), a determination may be made that a streaming video encoder fault has occurred. For example, optionally the frame intervals may be determined, and the average values (or other central tendency) of the R, G, B values may be calculated over a certain number of frames. The average of the R, G, B values may be compared to corresponding threshold values. If one of the R, G, or B values varies from a corresponding threshold by more than a specified amount or percentage (e.g., indicative of a color shift or the absence of a specific color in the output), a determination may be made that there is an encoder fault.

For example, RGB values in streaming content can be measured by capturing individual frames of the video and analyzing the pixel data for a given frame. A given pixel in a frame is typically encoded with three color components— Red, Green, and Blue (in the case of an RGB colorspace)— each represented as an integer value within a range, for example 0 to 255 in 8-bit color depth. A given frame can be processed by iterating through its pixel matrix, extracting and recording the intensity of each RGB channel. This data can then be averaged across all pixels in a frame and/or across multiple frames to determine average (or other central tendency) R, G, and B values. For real-time measurements streaming content (e.g., in the case of determining average R, G, B, values for live streaming content, such as for a sporting event) is decoded on-the-fly, and the RGB data is analyzed in sequential frames, optionally using GPU acceleration to handle the computational demands presented by such real time analysis.

Other central tendencies in addition to or instead of average colorspace may be utilized. In addition to or instead of the arithmetic average, various other techniques can be used to determine typical values. For example, the median, which represents the middle value in a sorted dataset, may be utilized and may be especially useful for skewed distributions as it is less affected by outliers. The mode, the most frequently occurring value, may also be utilized. Optionally, the trimmed mean, which excludes outliers by removing a percentage of extreme values may be utilized. The midhinge, calculated as the average of the first and third quartiles and focuses on the central part of the data, may optionally be utilized.

The number of frames used in generating an average (or other central tendency) may be selected to reduce the number of files generated or to reduce the amount of time it takes to detect an encoder fault. For example, 5 minutes' worth of frames may be utilized in generating the average. Thus, it may take 5 minutes from the occurrence of an encoder fault to detect such a fault. By way of further example, 1 minute's worth of frames may be utilized in generating the average. Thus, it may take only 1 minute from the occurrence of an encoder fault to detect such a fault, with the downside of having to generate 5 times as many files as compared to using 5 minutes' worth of frames.

Optionally, the encoder fault detection service 204B may access from memory and utilize different colorspace thresholds specified for different linear channels (where a given set of RGB colorspace thresholds may be utilized for one or more linear channels that have similar color histograms or average RGB values). For example, football, baseball, and soccer channels may typically have more green in a given frame (as compared to movie or TV series channels) as a result of green playing fields, resulting in a color shift in the corresponding color histogram. Thus, the green threshold for such sports channels may be set higher than the green threshold for a movie or TV series channel. Such different channel thresholds may be selected using an analysis of color histograms and/or RGB averages for large numbers of programs for respective channels.

Optionally, in addition or instead, different genre thresholds may be specified and utilized for different genres of programs (e.g., sports programs, news, concerts, standup comedy, movies, TV series, etc.). Such different genre thresholds may be selected using an analysis of color histograms and/or RGB averages for large numbers of programs for respective genres. Optionally, each pre-recorded program may have its own specified thresholds based on an analysis of a color histogram and/or RGB averages for that program. The foregoing thresholds may be stored in memory in association with an identification of the corresponding channel(s) for channel thresholds, an identification of the corresponding genre(s) for genre thresholds, and/or an identification of the corresponding program for program thresholds. Advantageously, the use of the same set of RGB thresholds for multiple channels and/or genres greatly reduces the amount of processing power as compared to the processing power needed to generate a different RGB threshold set for every program. In addition, the amount of memory needed to store RGB threshold sets is much less in the case of having the same set of RGB thresholds for multiple channels and/or genres as compared with having different thresholds stored for each program.

In response to determining that a streaming video encoder fault has occurred, the encoder fault correction service 206B may perform one or more corrective actions. Such corrective actions may include, by way of example, switching to an alternate streaming video encoder, restarting the faulty video encoder, transmitting an electronic message (e.g., comprising fault data and one or more instructions) to one or more destinations, and/or the like.

If the fault correction service 206B is instructed to attempt to correct a streaming outage and/or an audio fault, the fault correction service 206B may execute one or more corrective actions. For example, the fault correction service 206B may be configured to initiate the restart of an encoder, reboot a streaming server, and/or transmit an outage alert to one or more destinations indicating the detected encoder fault and/or providing an instructions to initiate the correction of the encoder fault.

Optionally, the encoder fault correction service 206B may be configured to determine that a given corrective action did not successfully resolve the encoder fault. For example, the encoder fault correction service 206B may continue to monitor the received streaming content colorspace after attempting to correct the streaming encoder fault, and if the colorspace fails to satisfy the corresponding thresholds, the encoder fault correction service 206B may determine that the corrective action failed to correct the streaming encoder fault. If, on the other hand, the colorspace satisfies the corresponding RGB thresholds, the encoder fault correction service 206B may determine that the corrective action succeeded in correcting the streaming encoder fault and not take further action to correct the now-properly functioning encoder.

The encoder fault correction service 206B may further be configured to, in response to determining that the given type of corrective action did not resolve the streaming outage and/or audio fault, repeat the given corrective action, or initiate a second type of corrective action, and so on. Thus, a sequence of corrective actions (e.g., switching to an alternate streaming video encoder, restarting the faulty video encoder, transmitting an electronic message (e.g., comprising fault data and one or more instructions) to one or more destinations, and/or the like) may be performed until the outage is resolved or a threshold number of attempts have been made or a certain amount of time has expired.

The closed caption fault detection service 208B may be configured to detect closed caption service outages with respect to an item of streaming content. Typically, closed captions may be included in video content streamed online. Captions may be encoded and embedded in the video segments within a video stream, or may be added to a captions playlist associated with the streaming video content for rendering by a client device. A third party service may be utilized to add captions by the stream encoder. If the closed captioning service becomes interrupted, the video content (e.g., streamed as part of a linear channel stream) is published without closed captions. In addition to providing a degraded viewing experience, a closed caption outage for greater than a threshold period of time may violate governmental (e.g., FCC) regulations.

For example, closed captions may be embedded in the video stream. Optionally, CEA-608 (SD) and CEA-708 (HD) standards may be used for closed captioning in streamed content. Respective closed captioning text (e.g., in the CEA-608/CEA-708 closed captions format) may be included in respective video frames as user data.

In particular, closed captioning, optionally formatted in accordance with CEA-608 or CEA-708, may optionally be provided via Supplemental Enhancement Information (SEI) messages. SEI messages are part of the H.264/AVC and H.265/HEVC video compression standards. SEI messages enable the inclusion of additional data that is not directly related to the video content but can be used to enhance the viewing experience. SEI messages can carry a variety of data types, including closed captions.

For example, closed caption data text (e.g., in the CEA-608/CEA-708 closed captions format) may be encoded within SEI messages. The SEI message containing the caption data may be inserted into the video stream at appropriate intervals, synchronized with the video frames.

Examples of how different streaming protocols handle SEI messages are as follows:

HLS (HTTP Live Streaming): HLS may carry SEI messages within the video segments. The SEI messages are interpreted by the client-side player to extract and display the closed captions.

DASH (Dynamic Adaptive Streaming over HTTP): Similar to HLS, DASH includes SEI messages in the video segments referenced in the DASH manifest (MPD) file.

MPEG-TS (MPEG Transport Stream): MPEG-TS may carry SEI messages along with the video and audio streams.

Advantageously, captions are tightly synchronized with the video frames since they are embedded directly in the video stream and there is no need for separate caption files, reducing the number of HTTP requests and potentially improving streaming efficiency.

The client-side player (e.g., a web browser, mobile app, connected television application, or set-top box) on a user device extracts SEI messages from the video stream during playback and performs SEI message decoding to extract and display the closed captions. The extracted caption data is rendered on the user device display, synchronized with the video (e.g., the video frames). This optionally comprises converting the SEI message data (e.g., CEA-608/708 captions) into a displayable format.

The closed caption fault detection service 208B may extract and count the number of words detected over a specified period of time. If the word count over the specified period of time falls below a specified word count threshold (e.g., 10, 20, or 50 words over a 5 minute period), the closed caption fault detection service 208B may determine that a closed caption fault has occurred. Because certain content (e.g., advertisements) may not have associated closed captioning, the closed caption fault detection service 208B is configured to avoid falsely identifying the lack of closed captioning due to an advertisement as a failure. Optionally, the specified period of time (a time window) in which closed captioning is to be counted is set to be large enough so that it is significantly longer than a typical ad pod (which includes advertisements for which there are no closed captioning). Thus, even if an ad pod falls within the monitored time period there will be sufficient primary content for which there is supposed to be closed captioning to provide a closed captioning word count large enough to satisfy the word count threshold (assuming there is no closed captioning fault). For example, if the typical maximum length of an ad pod is 5 minutes, the monitoring time window may be set to double the length of the ad pod, so that the time window is 10 minutes.

Optionally, different word count thresholds may be set for different linear channels, different genres, and/or different items of content to reflect different corresponding typical word counts for such channels, genres, and items of content.

Optionally, in addition or instead, the presence of an ad pod may be detected, and if a word count is in progress, the elapse of the monitoring time window may be paused until the ad pod has ended. For example, an ad pod in streaming content may be detected by analyzing patterns and/or metadata within the video stream that distinguish ads from regular programming. Ad pods often consist of multiple short advertisements played sequentially, and their detection optionally comprises examining the content's timing, structure, and transitions. Optionally, ad pods may be detected by monitoring metadata cues, such as SCTE-35 markers, which broadcasters may embed to signal the start and end of ad breaks. In the absence of such metadata, audio and visual patterns may be analyzed to identify characteristics such as abrupt transitions, changes in volume, recurring themes, and/or logos often associated with advertisements. Ad pods also tend to exhibit consistent duration patterns, such as 15, 30, or 60 seconds per ad, which a machine learning model may be utilized to identify. Optionally, frame-level analysis may be utilized to detect shifts in resolution, bitrate, or graphics that differ from the main, primary content and that are indicative of an ad. Using one or more of the foregoing techniques, ad pods can be reliably identified, enabling the exclusion of ad pods from a closed captioning word count time period.

In response to detecting a closed captioning outage, the closed caption fault correction service 210B may attempt to correct the closed captioning outage. Example corrective actions may include switching to an alternate streaming closed captioning source (e.g., an alternate streaming closed captioning server associated with a different closed captioning service), restarting the closed captioning server, initiation of a reconnection of a content streaming system to a closed captioning server, restarting of a network interface, transmitting an electronic message (e.g., an outage alert, comprising fault data and one or more instructions) to one or more destinations (e.g., via email, text message, and/or an application that includes a notification component), and/or the like. For example, when restarting a closed caption server running processes and services, such processes and services may be halted, and the server system may be rebooted to restore it to a fresh state. Optionally, a script may be utilized to automatically restart a closed caption server.

Figure 3A:
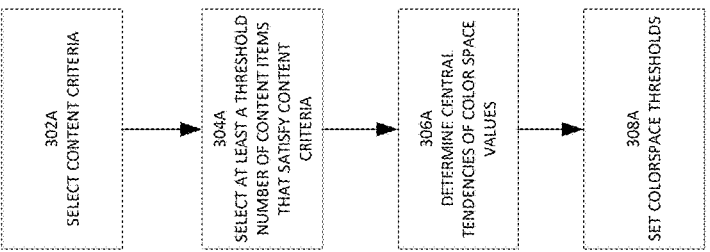
FIGS. 3A-3B illustrate example processes.

FIG. 3A illustrates an example process of determining colorspace thresholds that may be used to detect an encoder fault. Optionally, in order to reduce processor bandwidth utilization, different sets of content may be defined at block 302A, wherein content items in a given set of content use the same colorspace thresholds. A content item in a given set may have a common characteristic. For example, a characteristic may be belonging to a linear streaming channel or set of channels or a given genre (e.g., sports, news, movie, sitcom, etc.). At block 304A, a threshold number of representative items of content in a given set may be selected. At block 306A, the selected items of content are analyzed to determine central tendencies for a given colorspace color (e.g., average R, B, and B values). For example, a given frame of an item of streaming content may be processed by iterating through its pixel matrix, extracting and recording the intensity of each R, G, B channel. The intensity data may then be averaged across multiple frames to determine average R, G, and B values. At block 308A, the averaged data may be used to set corresponding R, G, B thresholds. The RGB thresholds may be stored in memory with an identifier indicating which channels, genres, and/or programs they are to be used with.

Figure 3B:
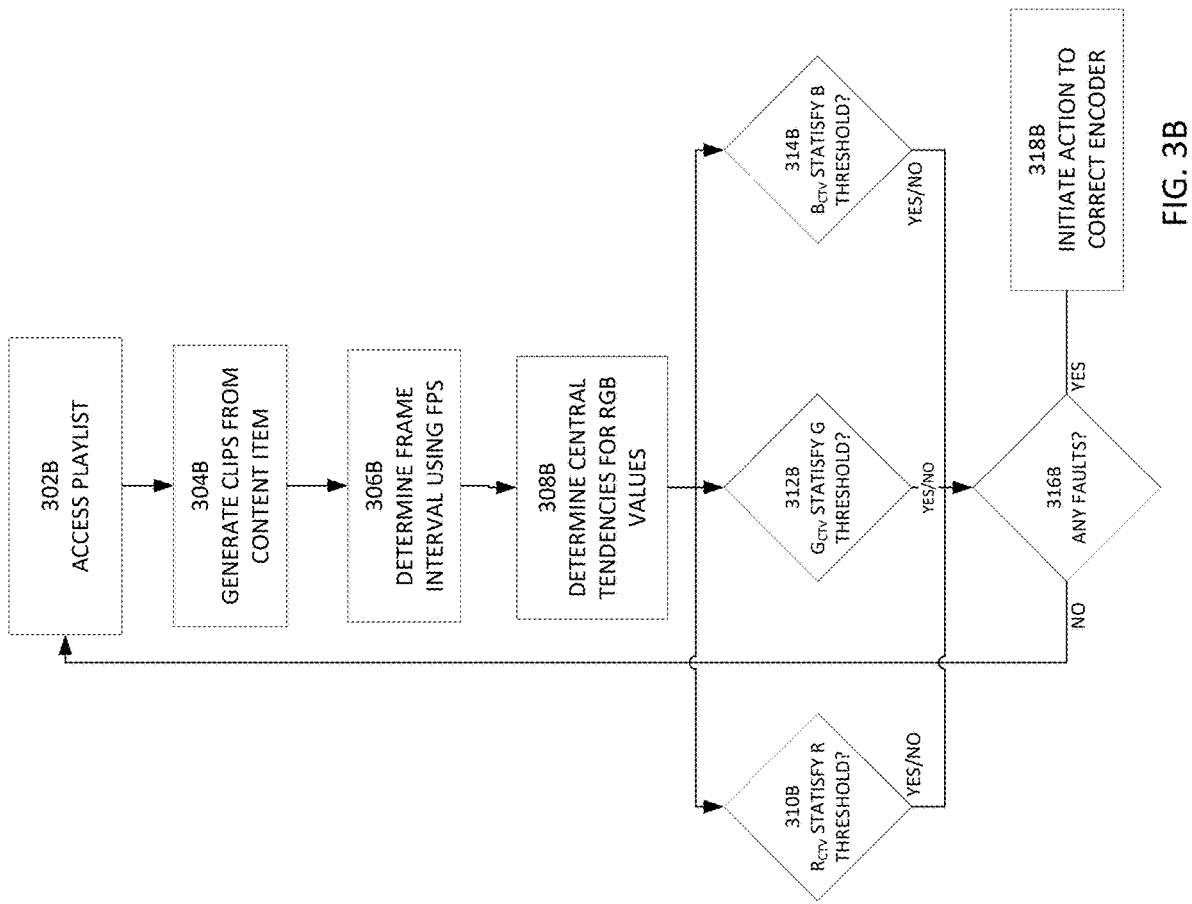

FIG. 3B illustrates an example process for detecting and correcting streaming video encoder faults as revealed by a failure in a color component channel (e.g., R, G, or B). At block 302B a playlist is accessed and ingested. The playlist may be in the form of a playlist manifest (e.g., an HLS or MPEG DASH manifest) including locators (e.g., URLs) pointing to segments and sections of primary (and optionally) interstitial content and locators (e.g., URLs), organized to correspond to the desired playback sequence. The playlist manifest may typically be transmitted to a client (e.g., a streaming application) on a user device. The client may then request a given item of content (e.g., section or segment) as needed, which may then be served (e.g., streamed) by the corresponding content source or intermediary to the client.

At block 304B, clips may be generated from the content referenced by the playlist. The clips may be sized (e.g., 1-10 minutes in length, such as 1, 2, 3, 4, 5, 6, 7, 8, 9, 10 minutes in length) so as to enable the RGB values of the frames to be quickly and accurately determined and to enable a determination to be quickly and accurately made so to whether there is an encoder fault. By way of illustration, the HLS Playlist URL or File Path may be determined (e.g., playlist.m3u8). The desired time length for the clip may be specified. A clip generation module may then access the playlist and the specified time length and then generate corresponding clips (e.g., 5 minute MP4 clips).

If the HLS playlist includes encryption (e.g., AES-128), the decryption key may be accessed and used by the clip generation module to decrypt the clip content.

At block 306B, the frame interval (time between consecutive frames) may be determined from the frames per second (FPS), by calculating the reciprocal of the FPS. The frame interval represents the duration, in seconds, of each frame in a video. The desired number of frames may then be selected to equal the desired time period (e.g., 5 minutes' worth of frames).

At block 308B, the central tendencies (e.g., average, mean, hinge, and/or the like) of the RGB values may be determined. For example, RGB values in the clip may be measured by capturing individual frames of the video and analyzing the pixel data for a given frame. The three color components (RGB) are represented as a respective integer value within a range, (e.g., 0 to 255 in 8-bit color depth). A given frame can be processed by iterating through its pixel matrix, extracting and recording the intensity of each RGB channel. This data can then be averaged across pixels in a frame and/or across multiple frames to determine average R, G, and B values.

At block 310B, the R central tendency (e.g., the average value determined at block 308B) is compared to the R threshold (accessed from memory) to determine if the R central tendency exceeds the R threshold (which would indicate an encoder fault with respect to the R component). At block 312B, the G central tendency (e.g., the average value determined at block 308B) is compared to the G threshold (accessed from memory) to determine if the G central tendency exceeds the G threshold (which would indicate an encoder fault with respect to the G component). At block 314B, the B central tendency (e.g., the average value determined at block 308B) is compared to the B threshold (accessed from memory) to determine if the B central tendency exceeds the B threshold (which would indicate an encoder fault with respect to the B component).

At block 316B, a determination is made as to whether any of the R, G, B central tendencies exceeded their threshold (which would indicate that there is an encoder fault). If a fault is detected with respect to the R, G, and/or B components, at block 318B corrective action(s) may be initiated and performed. For example, the corrective action(s) may comprise switching to an alternate streaming video encoder, restarting the faulty video encoder, transmitting an electronic message (e.g., comprising fault data and one or more instructions) to one or more destinations, and/or the like.

Figure 4A:
FIGS. 4A-4E illustrate example RGB plots and video frames.
Figure 4B:
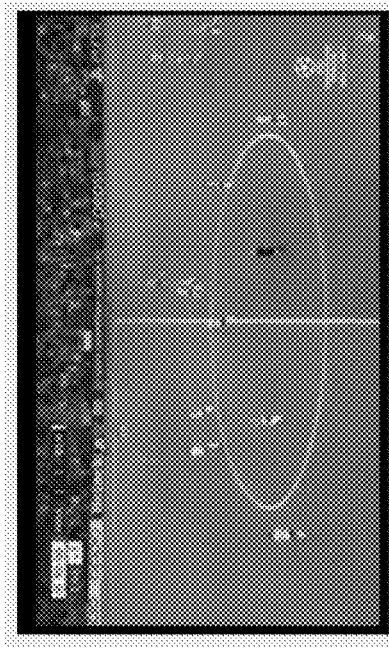
Figure 4B:

FIG. 4A illustrates example RGB histograms and an RGB plot showing RGB values for a normal colorspace for a news program 402A and a sports program 404A, where the video encoders are operating correctly. FIG. 4B illustrates an example RGB histogram and RGB values for a normal colorspace for a soccer program, where the video encoders are operating correctly. Because the video frames include a green field that occupies most of the frames, there is a significant green shift in the histogram and RGB plot. Hence, to accurately detect a failure when such a soccer game is being streamed, the green threshold needs to be set higher relative to the green threshold for a news program to avoid a false identification of an encoder fault.

Figure 4C:
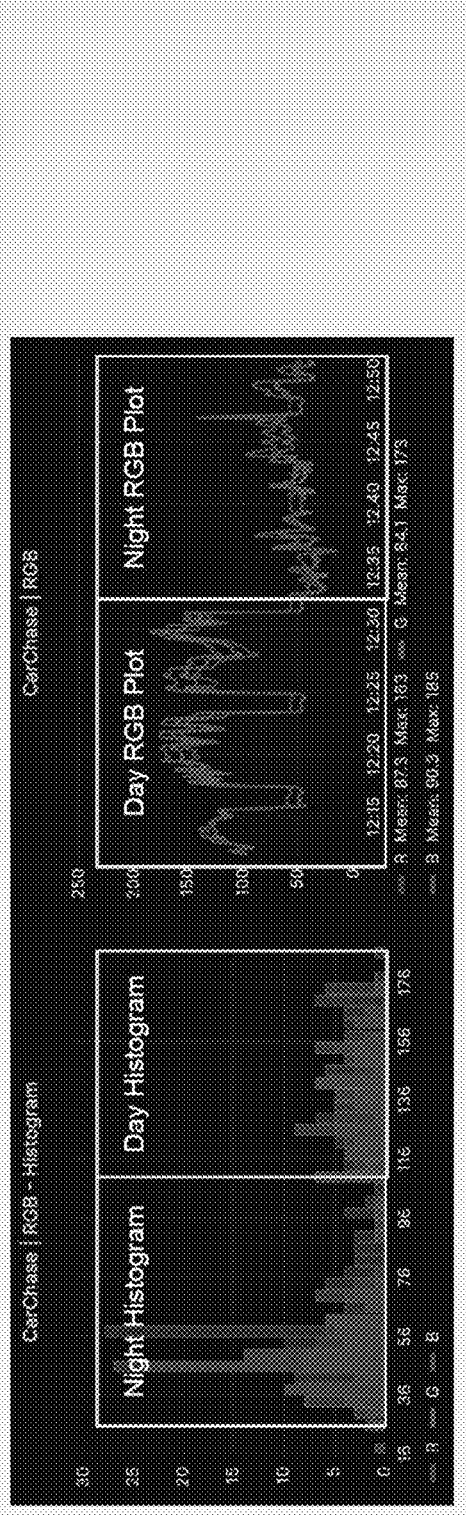
Figure 4C:
Figure 4C:
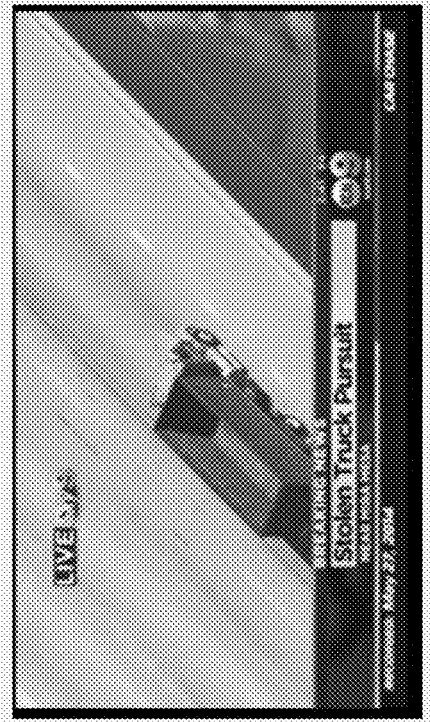

FIG. 4C illustrates frames comprising car chase scenes in the daylight and nighttime, with corresponding histograms and RGB plots. The plotted RGB values for the daylight scene are generally higher than those for the nighttime scene, and the RGB fault thresholds are advantageously set to work for both scenes.

Figure 4D:
Figure 4D:
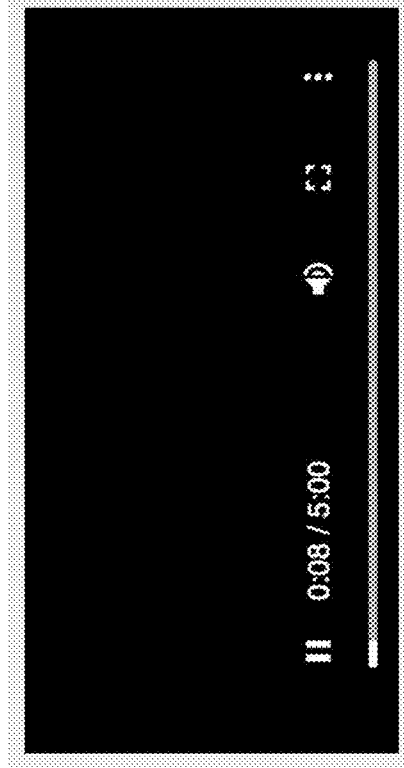

FIG. 4D illustrates a video player playback window, where the window is black, indicating a complete signal loss (wherein there is an outage of each of the RGB components). This loss can also be detected via the RGB plot, where the RGB central tendency values drop to zero for a period of time.

Figure 4E:
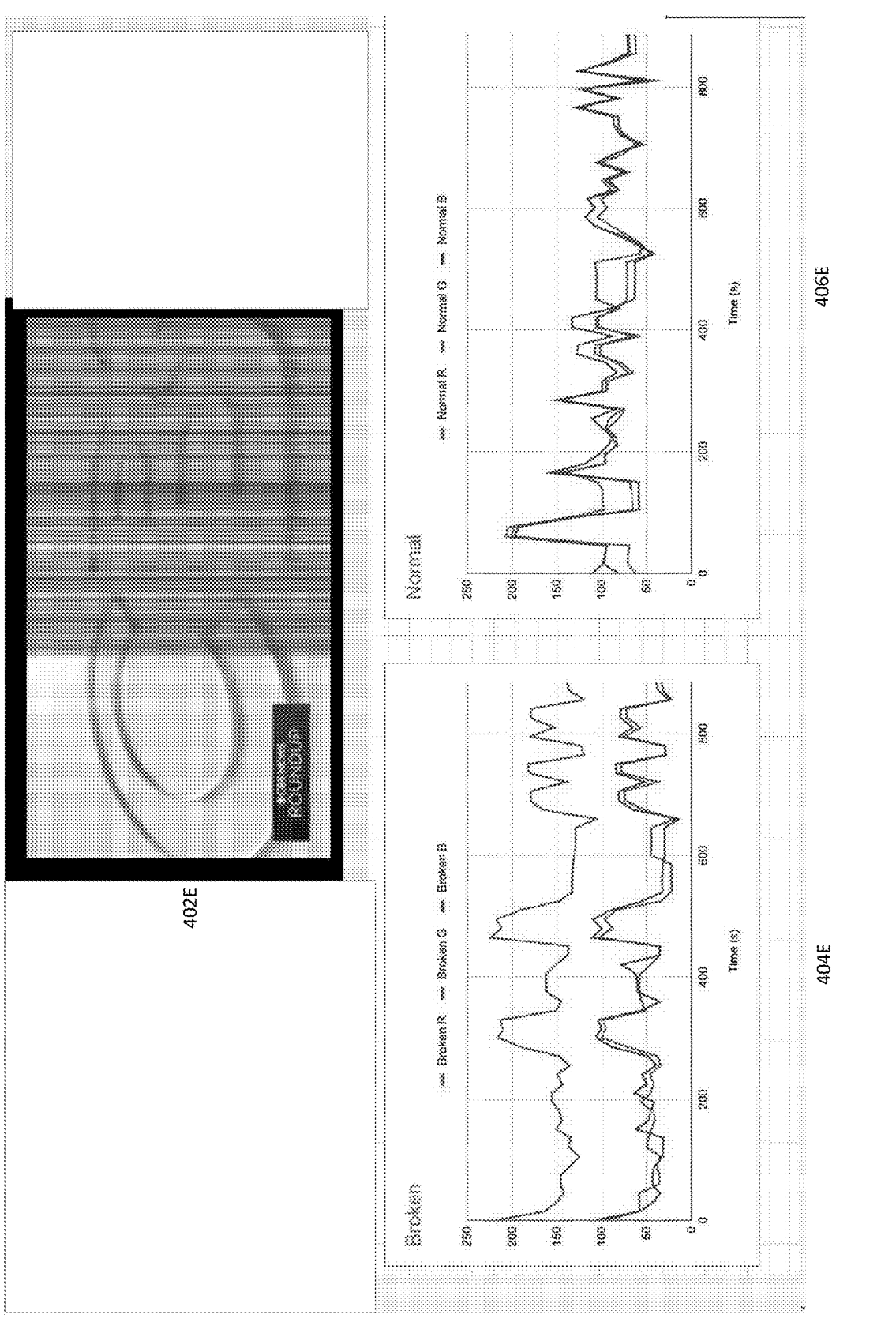

FIG. 4E illustrates a scenario, where the playback window 402E comprises a series of lines (which are green) that disrupt the playback image, indicating a failure of the video encoder with respect to the green component. The RGB plot 404E for the faulty encoder indicates the elevated green component, indicative of faulty video encoder operation. For comparison, the RGB plot 406E of the streaming content when the encoder is operating properly.

Figure 5A:
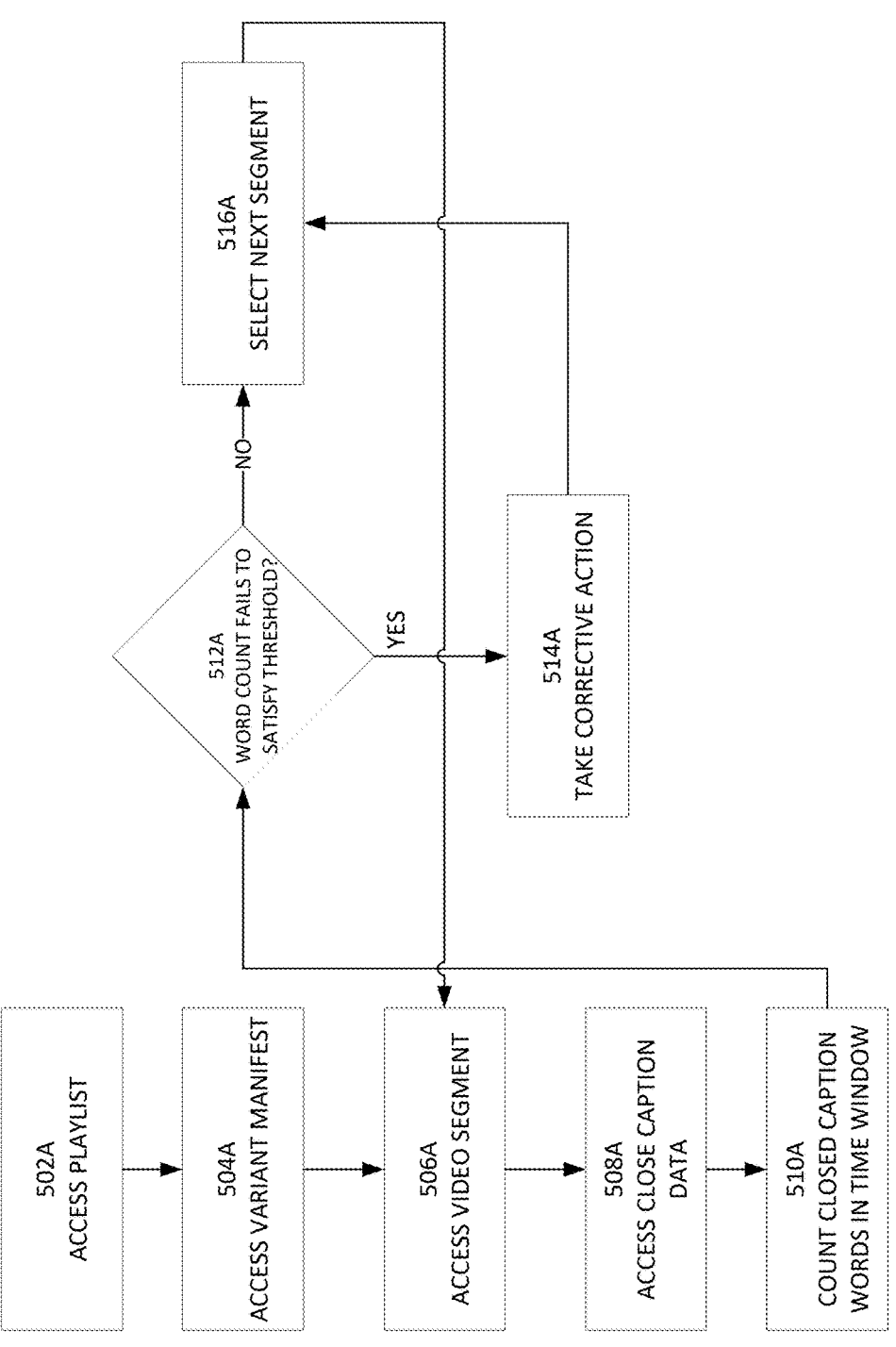
FIGS. 5A-B illustrate example processes.

FIG. 5A illustrates an example process to detecting and correcting a closed caption outage. At block 502A, the process accesses a video playlist (e.g., an HLS or MPEG DASH playlist). At block 504A, the process accesses a variant manifest which may be utilized in HTTP Live Streaming (HLS) or other adaptive streaming protocols to enable adaptive bitrate streaming. The variant manifest is a master playlist file that provides information about multiple versions (or variants) of the same video content, each optimized for different playback conditions. It may be used in HTTP Live Streaming (HLS) or similar adaptive streaming protocols to enable adaptive bitrate streaming.

At block 506A, the process accesses a video segment, which a given segment may include audio, video, and embedded closed captions (assuming there is not a closed caption service outage). At block 508A, the closed caption metadata text embedded in the video is decoded. Decoding closed caption metadata from streaming video may involve extracting and interpreting the embedded data within the video stream that carries the captions. The process used may depend on the streaming format and the type of closed caption encoding used (e.g., CEA-608/CEA-708, WebVTT, or TTML). For example, the FFmpeg utility may be utilized to extract captions from a video stream. At block 510A, a count is made of the closed caption words within a specified window. Optionally, the time window in which closed caption text is to be counted is set to be large enough so that it is significantly longer (e.g., 2-3 times as long) than a typical ad pod (which includes advertisements for which there are no closed captioning). Thus, even if an ad pod falls within the monitored window there will be sufficient primary content for which there is supposed to be closed captioning to provide a closed captioning word count large enough to satisfy the word count threshold, assuming there are no closed captioning outages.

At block 512A, the word count is compared to a word count threshold accessed from memory. If the word count satisfies the word count threshold (e.g., the word count is equal to or greater than the word count threshold), the process proceeds to block 516A, and the next video segment is accessed and the process repeats.

If the word count fails to satisfy the word count threshold (e.g., the word count is less than the threshold), at block 514A corrective action is taken. Such corrective actions may include, by way of example, switching to an alternate streaming closed captioning source, restarting the closed caption server, transmitting an electronic message (e.g., comprising fault data and one or more corrective action instructions) to one or more destinations, and/or the like. Optionally, after a first corrective action is taken, at block 516A, the process may perform another word count on another segment. If the new word count still fails to satisfy the word count threshold, optionally a second corrective action may be taken, and so on, until the outages is corrected or a threshold number of corrective attempts have been made.

Figure 5B:
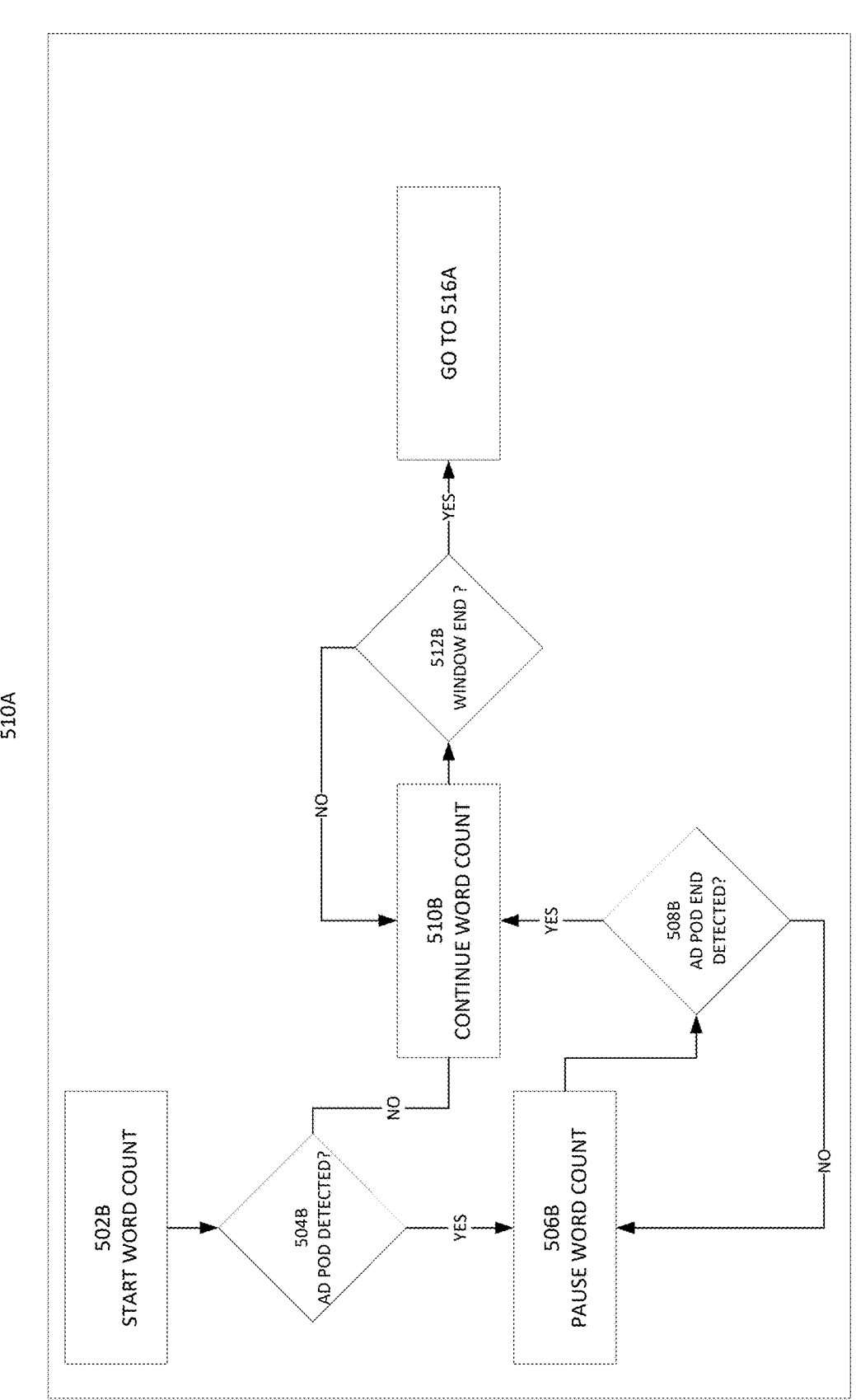

Optionally, the word count time window may be paused during block 510A in response to detecting content for which closed captioning is typically not provided, such as an advertisement. With reference to FIG. 5B, at block 502B the closed caption word count is initiated. The word count may be performed for a word count window of time (e.g., 1 minute, 2 minutes, 5 minutes, 10 minutes, or other amount of time). At block 504B, a determination is made as to whether an ad pod (which typically may not have closed captioning) is detected. For example, as similarly discussed elsewhere herein, optionally, ad pods may be detected by monitoring metadata cues, such as SCTE-35 markers, embedded to indicate the start and end of ad breaks. Optionally, audio and visual patterns may be analyzed to identify characteristics indicative of the beginning and ending of an ad pod (e.g., abrupt transitions, changes in volume, recurring themes, and/or logos). Optionally, frame-level analysis may be utilized to detect shifts in resolution, bitrate, or graphics that differ from the main, primary content and which may be indicative in the beginning and ending of an ad pod.

At least partly in response to detecting the beginning of an ad pod, at block 506B, the word count is optionally paused and the word count window elapsed time may optionally be paused (wherein the word count window may be extended for a length of time corresponding to the length of the ad pod). At block 508B, a determination is made as to whether the ad pod ending has been detected. If the ad pod end is detected, at block 510B, the word count elapsed time and closed caption word count are un-paused, and the word count continues. At block 512B, a determination is made as to whether the word count window has ended. If the word count window has not ended, the word count may continue. If the word count window has ended, the process proceeds to block 512A in FIG. 5A and a determination is made as to whether the word count satisfies the word count threshold.

Figure 6A:
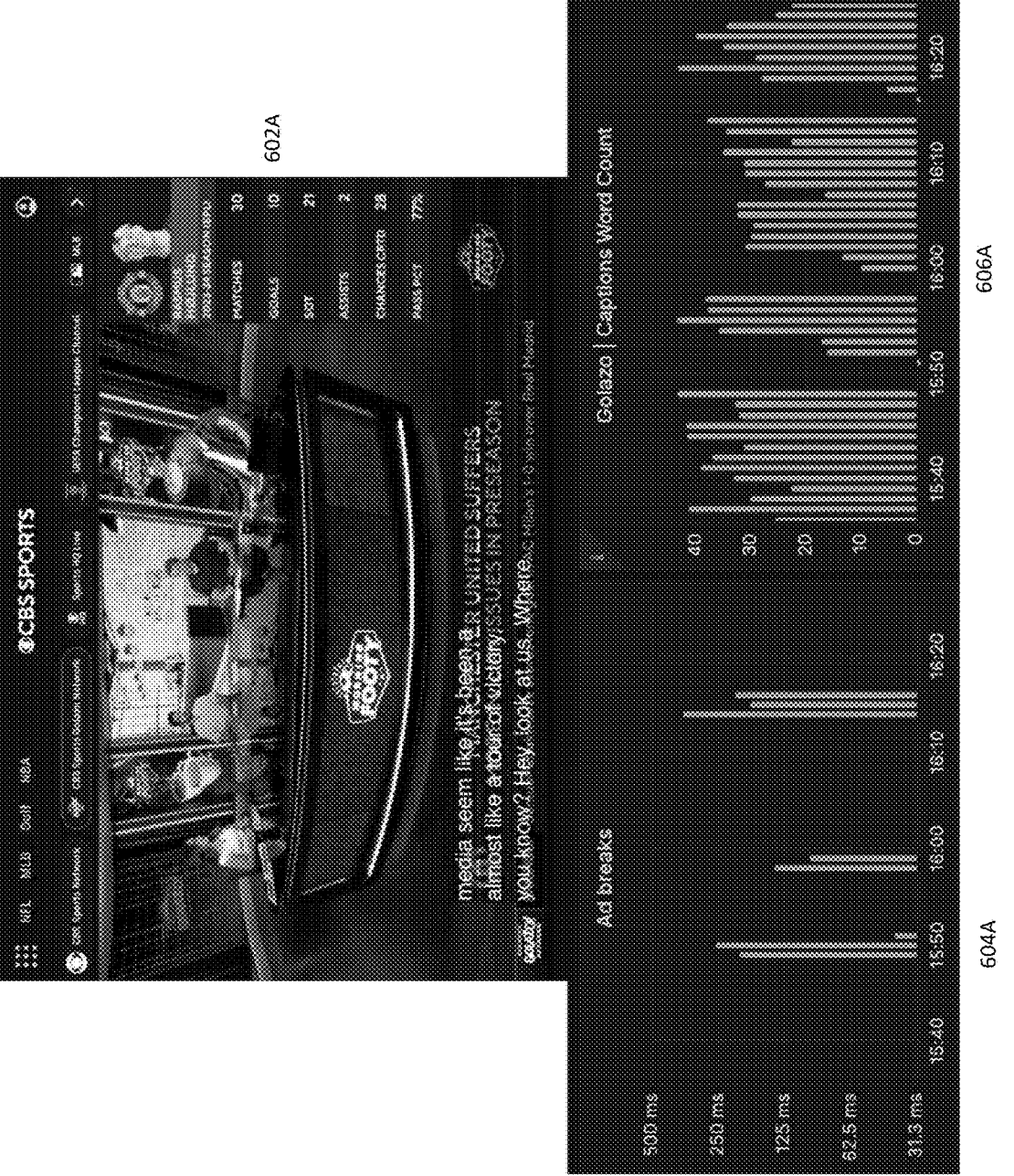
FIGS. 6A-6B illustrate example word count plots.

FIG. 6A illustrates a streaming video frame 602A where closed captioning is functioning properly. Plot 604A illustrates the location of ad pods in a time frame and plot 606A illustrates the corresponding closed caption word count over the same time frame, where there are no words during the ad pods.

Figure 6B:
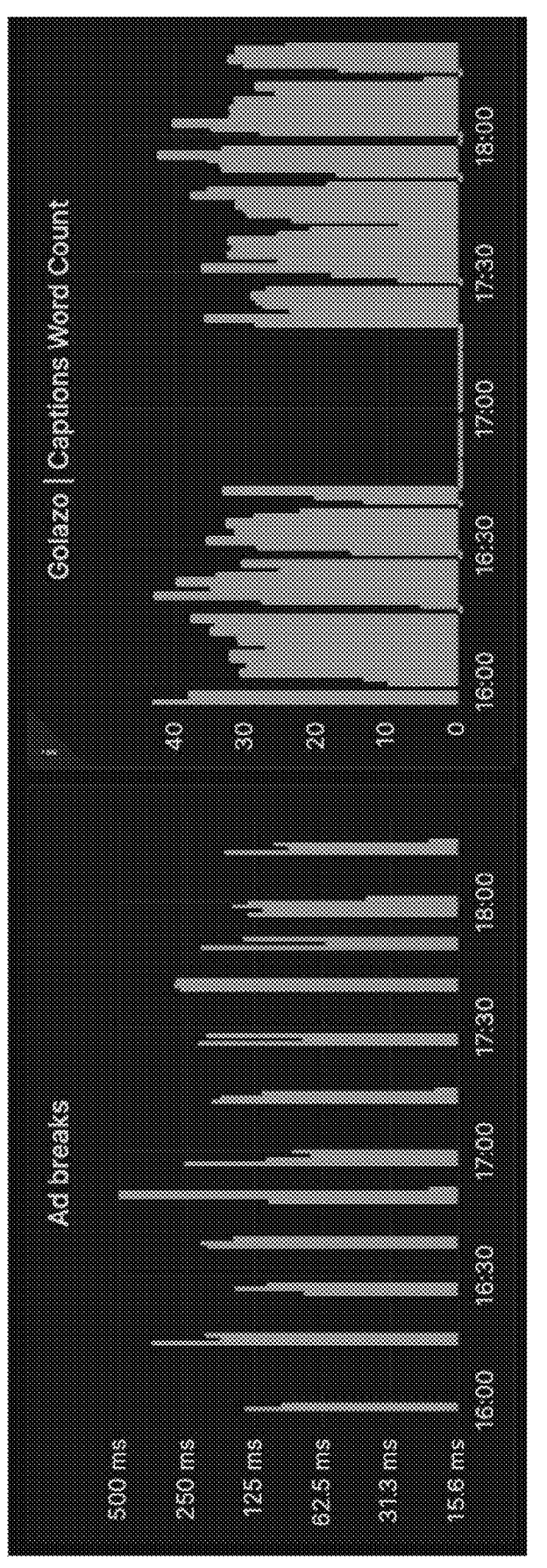

FIG. 6B illustrates plots where closed captioning is interrupted. Plot 602B illustrates the location of ad pods in a time frame and plot 604B illustrates the corresponding closed caption word count over the same time frame, where there are no words during the ad pods and also no words for a period of time where there are no ad pods.

Thus, an aspect of the present disclosure relates to methods and systems configured to detect video encoder faults. Another aspect of the present disclosure relates to the correction of such encoder faults. Still another aspect of the present disclosure relates to the detection of a closed captioning service outage. Yet another aspect of the present disclosure relates to the correction of a closed captioning service outage. Some or all of the aspects described herein may optionally be utilized together.

An aspect of the present disclosure relates to a system configured to detect and correct streaming-related faults, the system comprising: a computer device; non-transitory computer readable memory having program instructions stored thereon that when executed by the computer device cause the system to perform operations comprising: monitor streaming video content comprising three color components associated with a first colorspace; determine at least three central tendency values corresponding to the three color components using color component intensity values from a plurality of frames of the streaming video content; determine if the three central tendency values satisfy corresponding threshold values in a first set of threshold values; and at least partly in response to determining that at least one of the three central tendency values fails to satisfy a corresponding threshold value, initiate a corrective action comprising restart of a video encoder used to encode the streaming video content, switch to an alternate video encoder, and/or transmission of an electronic communication to one or more destinations.

Optionally, the operations further comprise: extract closed captioning data for a first item of streaming video content over a first time window; determine a closed caption word count from the closed captioning data; determine if the word count satisfies a first word quantity threshold; and at least partly in response to determining that the word count fails to satisfy the first word quantity threshold, initiate a corrective action. Operations, the operations further comprise: extract closed captioning data for a first item of streaming video content over a first time window; detect a start of a first pod of a first type; at least partly in response to detecting a start of the first pod of the first type, pause an elapse of the first time window; detect an end of the first pod of the first type; at least partly in response to detecting the end of the first pod of the first type, un-pause the elapse of the first time window; determine a closed caption word count from the closed captioning data over the first time window; determine if the word count satisfies a first word quantity threshold; and at least partly in response to determining that the word count fails to satisfy the first word quantity threshold, initiate a corrective action. Optionally, the system is configured to select the first set of threshold values based at least in part on a linear channel associated with the streaming video content. Optionally, the system is configured to select the first set of threshold values based at least in part on a genre associated with the streaming video content. Optionally, the first set of threshold values is configured to detect when one or more of the color components exceed a corresponding central tendency value by more than a first amount or first percentage. Optionally, the first set of threshold values is configured to detect when one or more of the color components are undergoing an outage.

An aspect of the present disclosure relates to a computer-implemented method, the method comprising: monitoring streaming video content comprising a least a first color component associated with a first colorspace; determining a first central tendency value corresponding to the first color component using color component intensity values of the first color component from a plurality of frames of the streaming video content; determining if the first central tendency value satisfies a first threshold value in a first set of threshold values; and at least partly in response to determining that the first central tendency value fails to satisfy the first threshold value, initiating a corrective action comprising restarting of a video encoder used to encode the streaming video content, switching to an alternate video encoder, and/or transmitting an electronic communication to one or more destinations.

Optionally, the method further comprises: extracting closed captioning data for a first item of streaming video content over a first time window; determining a closed caption word count from the closed captioning data; determining if the word count satisfies a first word quantity threshold; at least partly in response to determining that the word count fails to satisfy the first word quantity threshold, initiating a corrective action. Optionally, the method further comprises: extracting closed captioning data for a first item of streaming video content over a first time window; detecting a start of a first pod of a first type; at least partly in response to detecting the start of the first pod of the first type, pausing an elapse of the first time window; detecting an end of the first pod of the first type; at least partly in response to detecting the end of the first pod of the first type, un-pausing the elapse of the first time window; determining a closed caption word count from the closed captioning data over the first time window; determining if the word count satisfies a first word quantity threshold; and at least partly in response to determining that the word count fails to satisfy the first word quantity threshold, initiating a corrective action. Optionally, the method further comprises selecting the first set of threshold values based at least in part on a linear channel associated with the streaming video content. Optionally, the method further comprises selecting the first set of threshold values based at least in part on a genre associated with the streaming video content. Optionally, the first set of threshold values is configured to detect when the first color component exceeds the first central tendency value by more than a first amount or first percentage. Optionally, the first set of threshold values is configured to detect when the first color component is undergoing an outage.

An aspect of the present disclosure relates to a non-transitory computer readable memory having program instructions stored thereon that when executed by at least one computing device cause the at least one computing device to perform operations comprising: monitor streaming video content comprising a least a first color component associated with a first colorspace; determine a first central tendency value corresponding to the first color component using color component intensity values of the first color component from a plurality of frames of the streaming video content; determine if the first central tendency value satisfies a first threshold value in a first set of threshold values; and at least partly in response to determining that the first central tendency value fails to satisfy the first threshold value, initiate a corrective action comprising restart of a video encoder used to encode the streaming video content, switch to an alternate video encoder, and/or transmission of an electronic communication to one or more destinations.

Optionally, the operations further comprise: extract closed captioning data for a first item of streaming video content over a first time window; determine a closed caption word count from the closed captioning data; determine if the word count satisfies a first word quantity threshold; and at least partly in response to determining that the word count fails to satisfy the first word quantity threshold, initiate a corrective action. Optionally, the operations further comprise: extract closed captioning data for a first item of streaming video content over a first time window; detect a start of a first pod of a first type; at least partly in response to detecting the start of the first pod of the first type, pause an elapse of the first time window; detect an end of the first pod of the first type; at least partly in response to detecting the end of the first pod of the first type, un-pause the elapse of the first time window; determine a closed caption word count from the closed captioning data over the first time window; determine if the word count satisfies a first word quantity threshold; and at least partly in response to determining that the word count fails to satisfy the first word quantity threshold, initiate a corrective action. Optionally, the operations further comprise: select the first set of threshold values based at least in part on a linear channel associated with the streaming video content. Optionally, the operations further comprise: select the first set of threshold values based at least in part on a genre associated with the streaming video content. Optionally, the first set of threshold values is configured to detect when the first color component exceeds a first central tendency value by more than a first amount or first percentage. Optionally, the first set of threshold values is configured to detect when the first color component is undergoing an outage.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. A processor may include input registers, instructions registers, memory address registers, memory data registers, general processing and/or registers. The processor may include input arithmetic logic units, input and output ports, a control unit configured to control various circuits of the processor, such as the arithmetic logic unit, an address bus, a data bus, and a control bus. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop-down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the systems, devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to detect and correct streaming-related faults, the system comprising:
  a computer device; and
  non-transitory computer readable memory having program instructions stored thereon that when executed by the computer device cause the system to perform operations comprising:
    monitor streaming video content comprising three color components associated with a first colorspace;
    determine at least three central tendency values corresponding to the three color components using color component intensity values from a plurality of frames of the streaming video content;
    determine if the three central tendency values satisfy corresponding threshold values in a first set of threshold values; and
    at least partly in response to determining that at least one of the three central tendency values fails to satisfy a corresponding threshold value in the first set of threshold values:
    initiate a corrective action comprising restart of a video encoder used to encode the streaming video content, switch to an alternate video encoder, and/or transmission of an electronic communication to one or more destinations.

2. The system as defined in claim 1, wherein the operations further comprise:
  extract closed captioning data for a first item of streaming video content over a first time window;
    determine a closed caption word count from the closed captioning data;
  determine if the word count satisfies a first word quantity threshold; and at least partly in response to determining that the word count fails to satisfy the closed caption server and/or transmission of an electronic communication indicating a closed caption fault to one or more destinations.

3. The system as defined in claim 1, wherein the operations further comprise:

extract closed captioning data for a first item of streaming video content over a first time window;

detect a start of a first pod of a first type;

at least partly in response to detecting a start of the first pod of the first type, pause an elapse of the first time window;

detect an end of the first pod of the first type;

at least partly in response to detecting the end of the first pod of the first type, un-pause the elapse of the first time window;

determine a closed caption word count from the closed captioning data over the first time window;

determine if the word count satisfies a first word quantity threshold; and at least partly in response to determining that the word count fails to satisfy the first word quantity threshold, initiate a corrective action.

4. The system as defined in claim 1, wherein the system is configured to select the first set of threshold values based at least in part on a linear channel associated with the streaming video content.

5. The system as defined in claim 1, wherein the system is configured to select the first set of threshold values based at least in part on a genre associated with the streaming video content.

6. The system as defined in claim 1, wherein the first set of threshold values is configured to detect when one or more of the color components exceed a corresponding central tendency value by more than a first amount or first percentage.

7. The system as defined in claim 1, wherein the first set of threshold values is configured to detect when one or more of the color components are undergoing an outage.

8. A computer-implemented method, the method comprising:

monitoring streaming video content comprising a least a first color component associated with a first colorspace;

determining a first central tendency value corresponding to the first color component using color component intensity values of the first color component from a plurality of frames of the streaming video content;

determining if the first central tendency value satisfies a first threshold value in a first set of threshold values; and at least partly in response to determining that the first central tendency value fails to satisfy the first threshold value, initiating a corrective action comprising restarting of a video encoder used to encode the streaming video content, switching to an alternate video encoder, and/or transmitting an electronic communication to one or more destinations.

9. The computer-implemented method as defined in claim 8, the method further comprising:

extracting closed captioning data for a first item of streaming video content over a first time window;

determining a closed caption word count from the closed captioning data;

determining if the word count satisfies a first word quantity threshold; and at least partly in response to determining that the word count fails to satisfy the first word quantity threshold, initiating a corrective action.

10. The method as defined in claim 8, the method further comprising:

extracting closed captioning data for a first item of streaming video content over a first time window;

detecting a start of a first pod of a first type;

at least partly in response to detecting the start of the first pod of the first type, pausing an elapse of the first time window;

detecting an end of the first pod of the first type;

at least partly in response to detecting the end of the first pod of the first type, un-pausing the elapse of the first time window;

determining a closed caption word count from the closed captioning data over the first time window;

determining if the word count satisfies a first word quantity threshold; and at least partly in response to determining that the word count fails to satisfy the first word quantity threshold, initiating a corrective action.

11. The computer-implemented method as defined in claim 8, the method further comprising selecting the first set of threshold values based at least in part on a linear channel associated with the streaming video content.

12. The computer-implemented method as defined in claim 8, the method further comprising selecting the first set of threshold values based at least in part on a genre associated with the streaming video content.

13. The computer-implemented method as defined in claim 8, wherein the first set of threshold values is configured to detect when the first color component exceeds the first central tendency value by more than a first amount or first percentage.

14. The computer-implemented method as defined in claim 8, wherein the first set of threshold values is configured to detect when the first color component is undergoing an outage.

15. Non-transitory computer readable memory having program instructions stored thereon that when executed by at least one computing device cause the at least one computing device to perform operations comprising:

monitor streaming video content comprising a least a first color component associated with a first colorspace;

determine a first central tendency value corresponding to the first color component using color component intensity values of the first color component from a plurality of frames of the streaming video content;

determine if the first central tendency value satisfies a first threshold value in a first set of threshold values; and at least partly in response to determining that the first central tendency value fails to satisfy the first threshold value, initiate a corrective action comprising restart of a video encoder used to encode the streaming video content, switch to an alternate video encoder, and/or transmission of an electronic communication to one or more destinations.

16. The non-transitory computer readable memory as defined in claim 15, the operations further comprising:

extract closed captioning data for a first item of streaming video content over a first time window;

determine a closed caption word count from the closed captioning data;

determine if the word count satisfies a first word quantity threshold; and

23 at least partly in response to determining that the word count fails to satisfy the first word quantity threshold, initiate a corrective action.

17. The non-transitory computer readable memory as defined in claim 15, the operations further comprising:

extract closed captioning data for a first item of streaming video content over a first time window;

detect a start of a first pod of a first type;

at least partly in response to detecting the start of the first pod of the first type, pause an elapse of the first time window;

detect an end of the first pod of the first type;

at least partly in response to detecting the end of the first pod of the first type, un-pause the elapse of the first time window;

determine a closed caption word count from the closed captioning data over the first time window;

determine if the word count satisfies a first word quantity threshold; and

24 at least partly in response to determining that the word count fails to satisfy the first word quantity threshold, initiate a corrective action.

18. The non-transitory computer readable memory as defined in claim 15, the operations further comprising: select the first set of threshold values based at least in part on a linear channel associated with the streaming video content.

19. The non-transitory computer readable memory as defined in claim 15, the operations further comprising: select the first set of threshold values based at least in part on a genre associated with the streaming video content.

20. The non-transitory computer readable memory as defined in claim 15, wherein the first set of threshold values is configured to detect when the first color component exceeds the first central tendency value by more than a first amount or first percentage.

21. The non-transitory computer readable memory as defined in claim 15, wherein the first set of threshold values is configured to detect when the first color component is undergoing an outage.

* * * * *